US012798549B2

(12) United States Patent
Badger et al.

(10) Patent No.: US 12,798,549 B2
(45) Date of Patent: Nov. 17, 2026

(54) GENERATOR LASH CROSSING MANAGEMENT IN HYBRID POWERSPLIT VEHICLE

(71) Applicant: Ford Global Technologies, LLC, Dearborn, MI (US)

(72) Inventors: Justin Badger, Plymouth, MI (US); Carol Louise Okubo, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 18/545,123

(22) Filed: Dec. 19, 2023

(65) Prior Publication Data

US 2025/0196840 A1 Jun. 19, 2025

(51) Int. Cl.

| | |
|---|---|
| ***B60W 10/06*** | (2006.01) |
| ***B60L 58/12*** | (2019.01) |
| ***B60W 10/08*** | (2006.01) |
| ***B60W 20/13*** | (2016.01) |

(52) U.S. Cl.

CPC ............. *B60W 20/13* (2016.01); *B60L 58/12* (2019.02); *B60W 2510/081* (2013.01)

(58) Field of Classification Search

CPC ........... B60W 20/13; B60W 2510/081; B60W 2540/10; B60W 2710/0666; B60W 2710/083; B60W 10/06; B60W 10/08; B60W 20/17; B60W 2710/0644; B60L 58/12

See application file for complete search history.

(56) References Cited

U.S. PATENT DOCUMENTS

| | | | | |
|---|---|---|---|---|
| 6,754,573 | B2 | 6/2004 | Russell et al. | |
| 8,818,660 | B2 | 8/2014 | Heap et al. | |
| 11,708,060 | B2 | 7/2023 | Yard et al. | |
| 2012/0203417 | A1* | 8/2012 | Matsui .................. | B60W 20/00 180/65.265 |
| 2017/0036672 | A1* | 2/2017 | Takuda .................. | B60L 50/15 |
| 2017/0355361 | A1* | 12/2017 | Yamazaki ................ | B60K 6/28 |
| 2018/0312081 | A1 | 11/2018 | Hancock et al. | |
| 2021/0171012 | A1 | 6/2021 | Ravichandran et al. | |
| 2023/0241983 | A1 | 8/2023 | Ravichandran et al. | |

FOREIGN PATENT DOCUMENTS

| | | | | | |
|---|---|---|---|---|---|
| CN | 115923765 | A | * | 4/2023 | ............ B60W 20/10 |
| GB | 2590960 | A | * | 7/2021 | ............ B60W 10/08 |
| JP | 2022163420 | A | * | 10/2022 | ............ F02D 29/06 |
| KR | 101573633 | B1 | * | 12/2015 | ............ B60W 10/08 |

* cited by examiner

*Primary Examiner* — Tisha D Lewis

(74) *Attorney, Agent, or Firm* — McCoy Russell LLP

(57) ABSTRACT

Methods and systems are provided for managing lash crossing in a hybrid powersplit vehicle. In one aspect, the method includes limiting an increase in engine speed in response to generator torque approaching zero generator torque during selected conditions. In one example, the selected conditions include less than threshold driver pedal operation, non-engine startup conditions, emissions control, and greater than threshold battery state of charge.

17 Claims, 5 Drawing Sheets

GENERATOR LASH CROSSING MANAGEMENT IN HYBRID POWERSPLIT VEHICLE

FIELD

The present subject matter relates to a system and a method for generator lash crossing management in a vehicle, particularly a hybrid powersplit vehicle.

BACKGROUND/SUMMARY

A hybrid powersplit powertrain is a hybrid propulsion system used in vehicles that integrates a combustion engine, an electric motor, and an electric generator with a transmission to deliver wheel torque to a drive axle. The engine, the motor, and the generator may work in combination to propel the vehicle. For example, the generator may control the engine speed and the motor may provide tractive force.

When the engine is running, the generator may control an engine speed target by applying positive or negative torque. The amount of generator torque requested to maintain the engine speed may depend on the torque output of the engine. Further, if the engine is running and operating at a low torque, such as during a full high-voltage battery condition, the generator torque may be negative and near zero. If a driver then depresses the driver pedal with sufficient demand, the powertrain control system will aim to increase engine speed to meet the torque request, which due to low engine torque will result in a positive generator torque command to meet the requested engine speed increase. This results in the generator passing from negative torque to positive torque, which may be referred to as crossing lash or lash traversal. During lash traversal, backlash (or lash) may be caused due to a clearance or a play between mating parts. However, in some examples, mechanical play in mating parts may produce clunk (e.g., also called shunt), which is refers to a sensation of the teeth of gears caused upon contact after crossing the zero torque point, also called the lash zone, that can be heard and felt in the vehicle.

Other attempts to address clunk resulting from backlash include torque shaping through the lash zone. Russell and Kotwicki in U.S. Pat. No. 6,754,573 teach a system and method for transitioning the lash zone based on a speed ratio estimate across a torque converter. When near the lash zone, engine torque may be adjusted at a predetermined rate until the system passes through the lash zone. Engine torque slowed down going through the lash zone in this way minimizes clunk by bringing the gear teeth into contact gently.

However, the inventors recognize potential issues with such systems. As one example, torque shaping to minimize clunk in hybrid powersplit powertrains is particularly challenging due to the multiple power inputs to the transmission and the complicated power flows resulting therefrom. For example, the particular source of the clunk may be difficult to identify, such as between which components of the transmission gear train and under what conditions. Consequently, applying a torque shaping approach to a powersplit powertrain may be impractical.

In one example, the issues described above may be addressed by a method of managing lash crossing in a hybrid powersplit vehicle, the method comprising limiting an increase in engine speed in response to generator torque approaching zero torque during selected conditions. In this way, lash crossing is reduced during selected conditions, and engine speed is allowed to increase as more engine torque becomes available.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
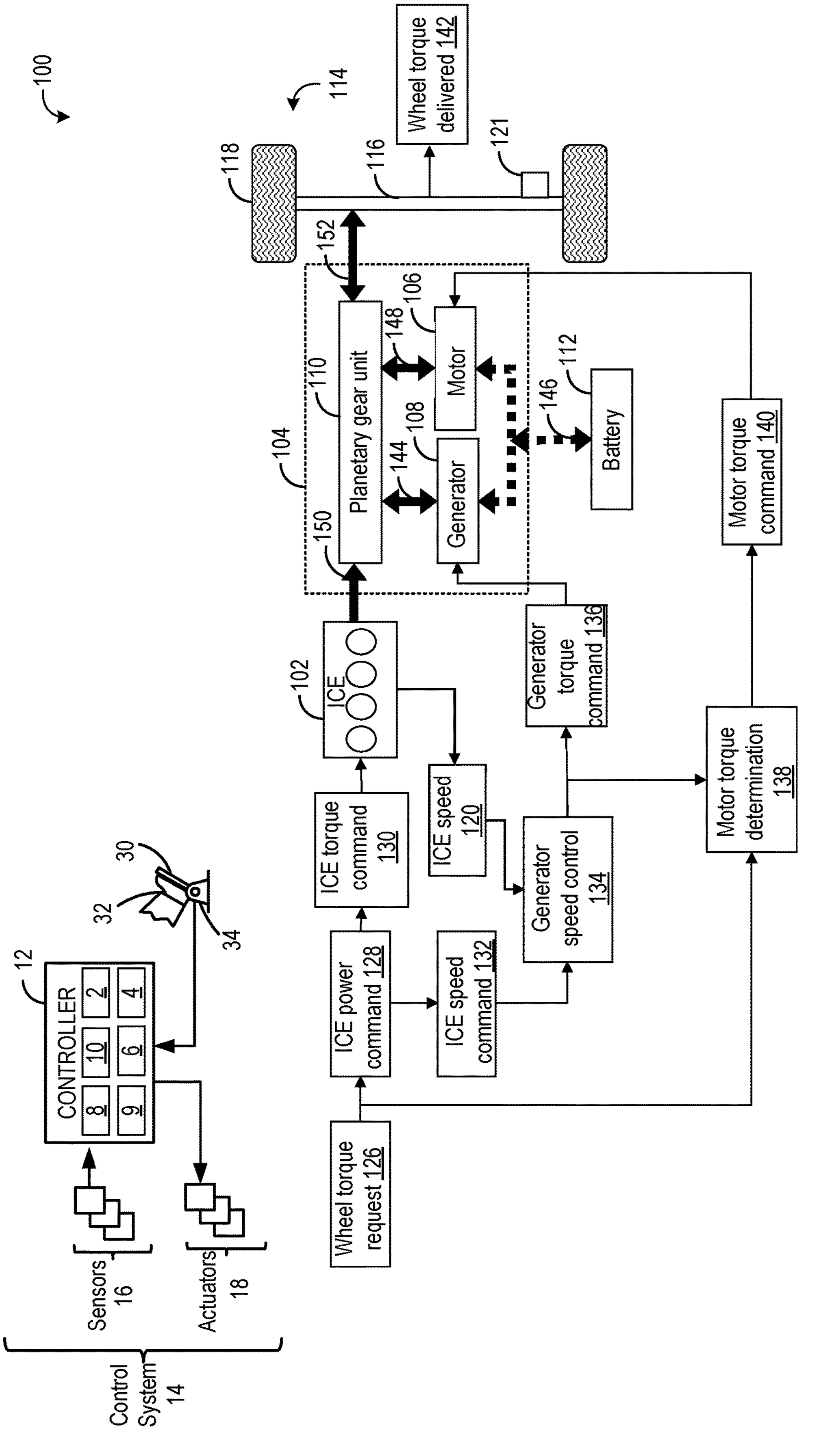
FIG. 1 is a schematic diagram of a hybrid powersplit vehicle.
Figure 2A:
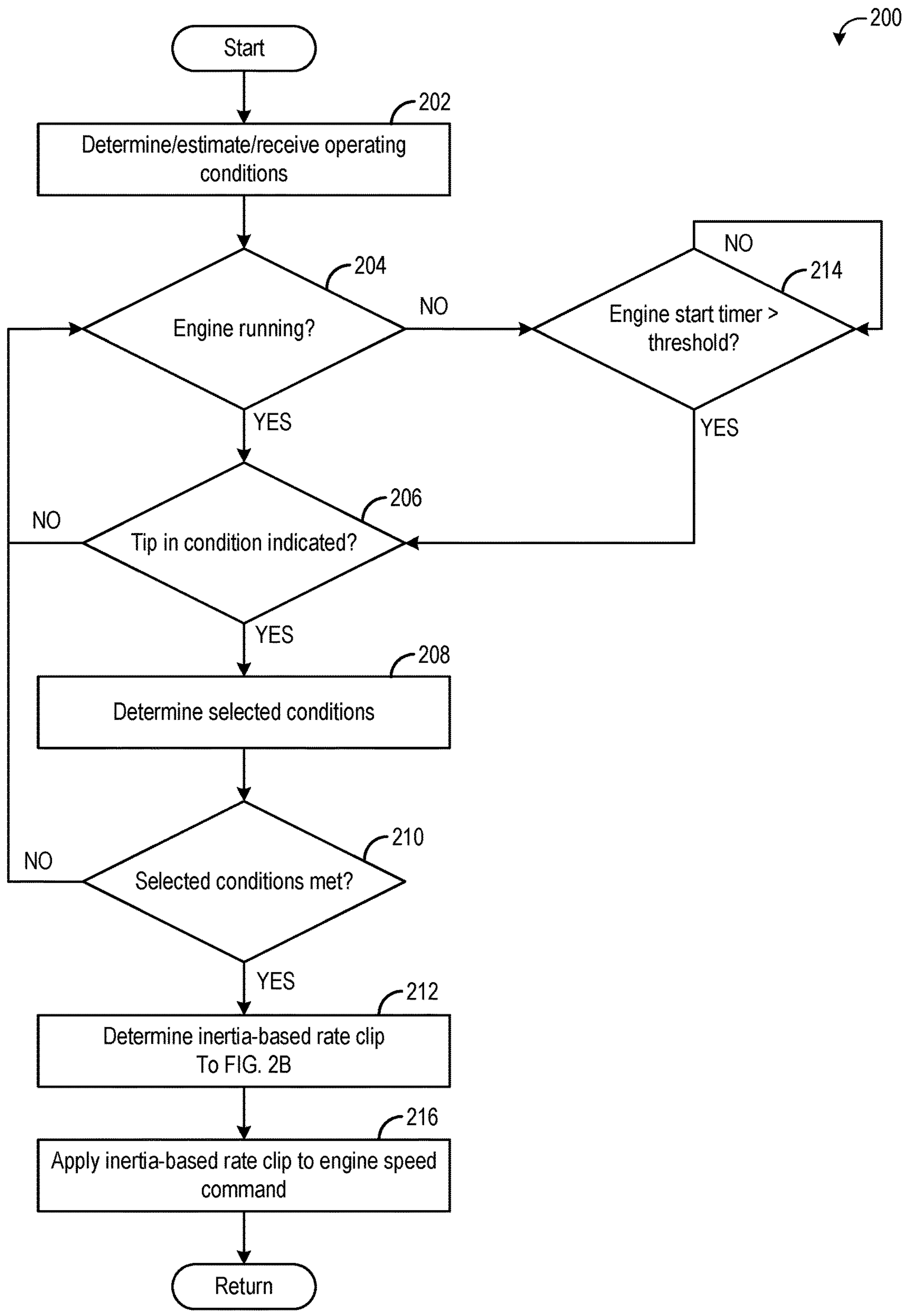
FIG. 2A is a first flowchart illustrating an example method for lash crossing management.
Figure 2B:
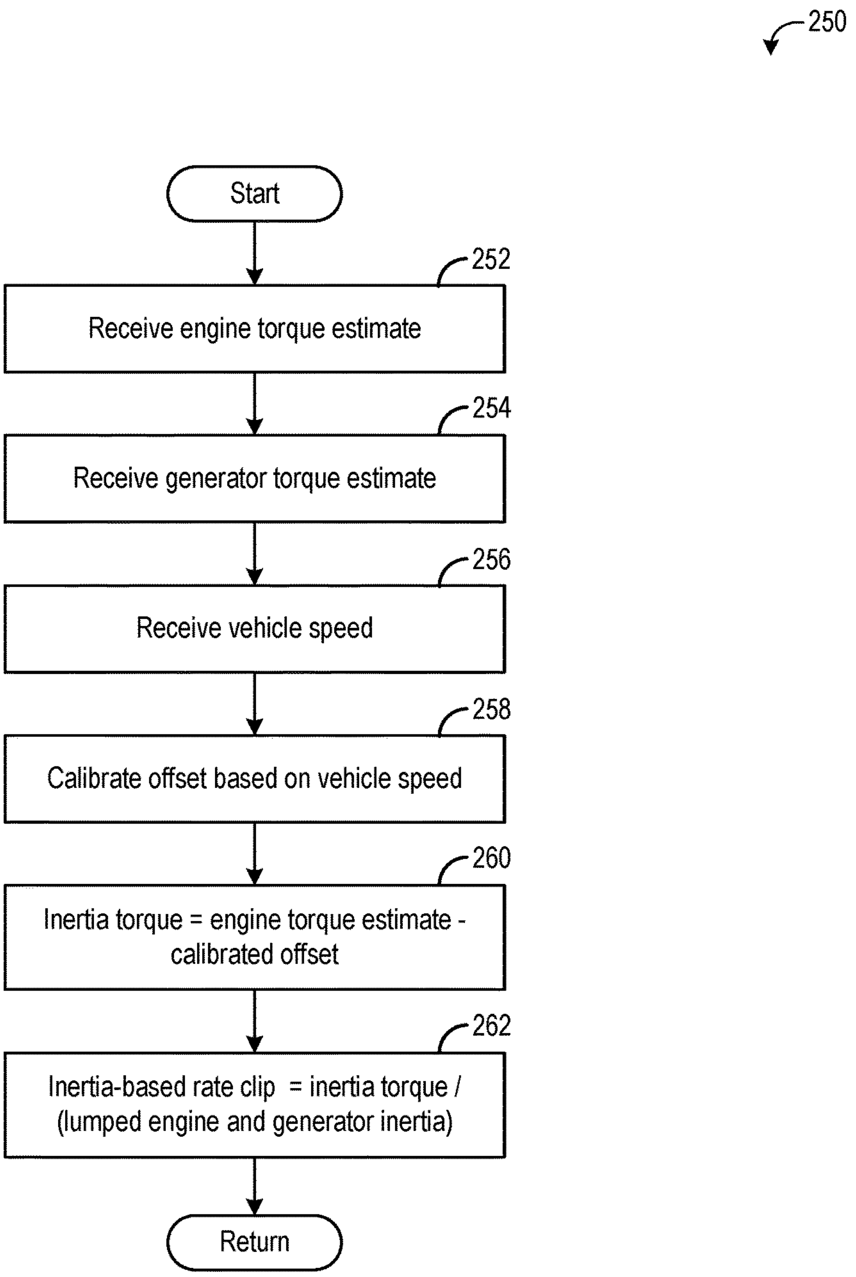
FIG. 2B is second flowchart illustrating an example method for lash crossing management.
Figure 3:
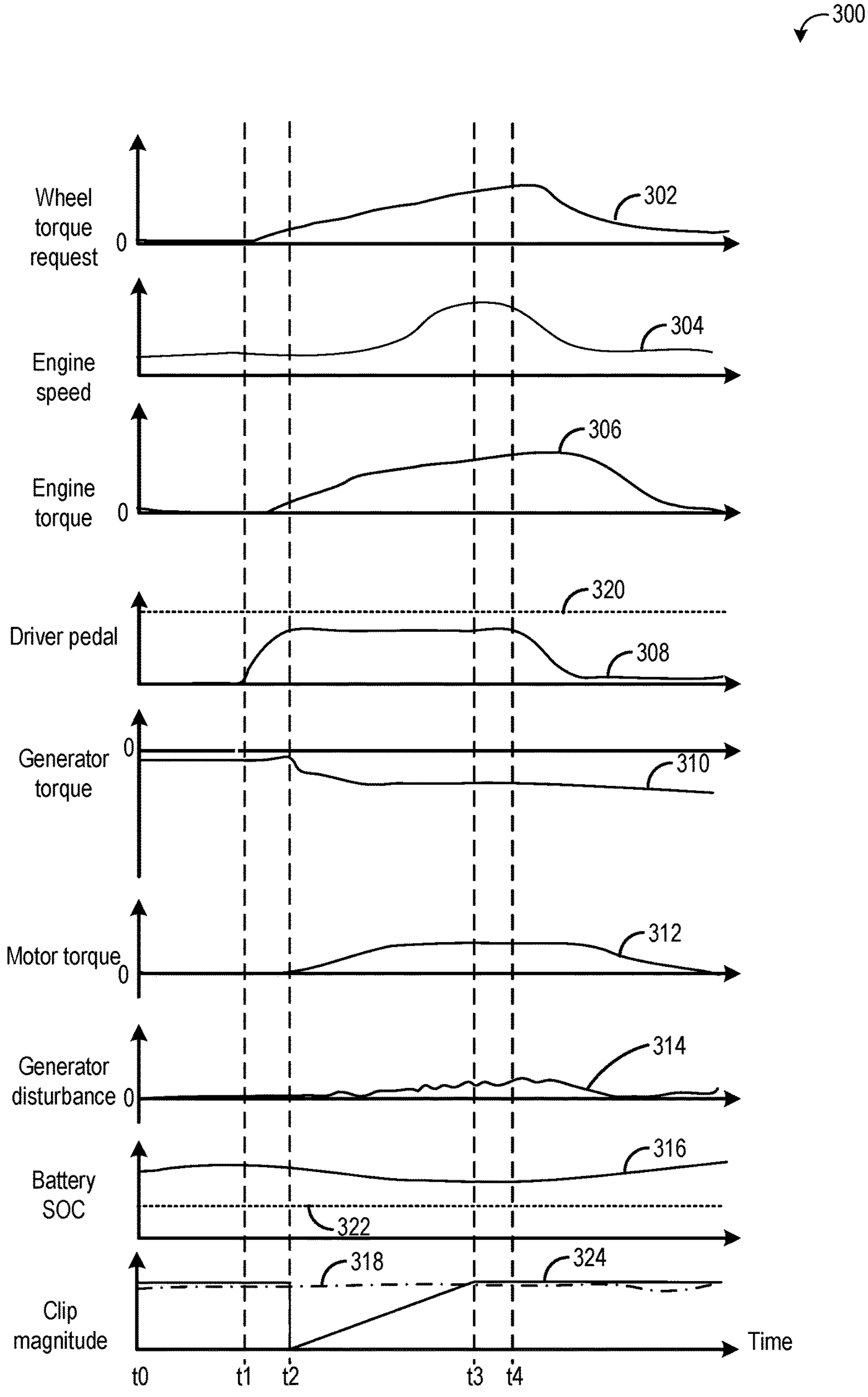
FIG. 3 is a timing diagram illustrating an example prophetic operation of the method for lash crossing management.
Figure 4:
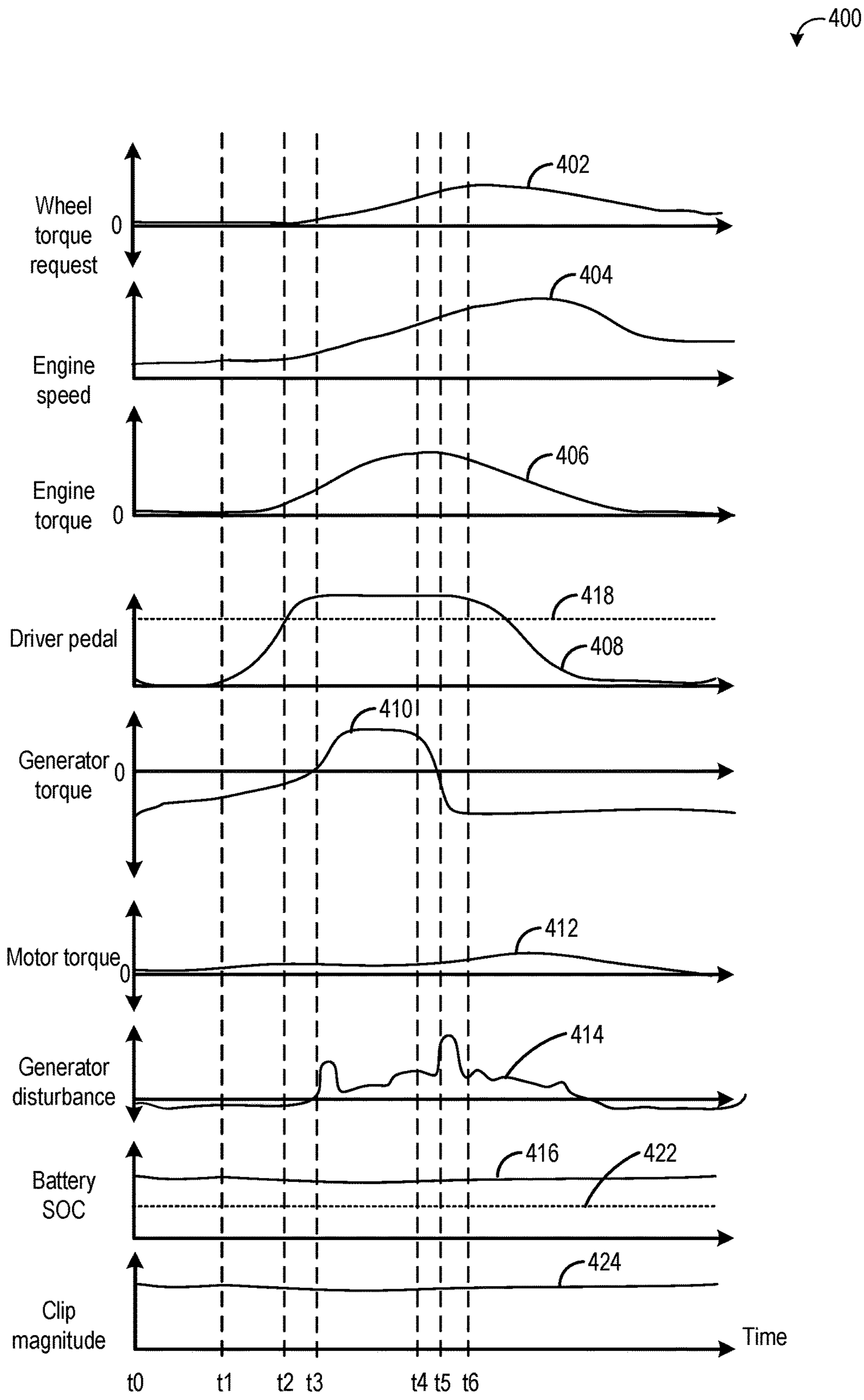
FIG. 4 is a timing diagram illustrating a second example prophetic operation of the method for lash crossing management.

The following description relates to systems and methods for generator lash crossing management in a split power delivery hybrid vehicle of the type illustrated in FIG. 1. Such a vehicle may include an engine, a planetary gear unit, an electric motor, and an electric generator. To manage potential clunk during a generator torque reversal, a lash crossing management strategy may be implemented by a powersplit powertrain control system of the vehicle, which is shown in FIG. 1. FIG. 2A is a flowchart of a first method 200 for generator lash crossing management in the vehicle system described in FIG. 1. FIG. 2B is a flowchart of a second method 250 for generator lash crossing management in the vehicle system described in FIG. 1. In some examples, the method reduces clunk incidence produced by generator lash crossing by applying an inertia-based rate clip to an engine speed increase during selected conditions. FIGS. 3-4 are timing diagrams of prophetic examples of operating one or more of the methods for lash crossing management as described herein. For example, FIG. 3 shows a first prophetic example of the method where selected conditions are met and the inertia-based rate clip is applied to the engine speed increase. FIG. 4 shows a second prophetic example of the method where selected conditions are not met and the engine speed increase is commanded without the inertia-based rate clip.

FIG. 1 includes a schematic block diagram representation of a vehicle system 100 to illustrate one embodiment of a system or method for controlling a vehicle powertrain according to the present disclosure. Vehicle system 100 generally represents any vehicle having a hybrid electric powertrain with an internal combustion engine (ICE) 102. In the depicted embodiment, the vehicle system 100 is a hybrid electric vehicle (HEV) system wherein a powertrain 104 includes the ICE 102, a battery 112, a planetary gear unit, a motor 106 and a generator 108. The vehicle system 100 includes a drive axle 114 comprising an axle shaft 116 coupled to a pair of wheels 118 and the powertrain 104.

Vehicle system 100 includes a control system 14 with a controller 12 receiving signals from various sensors 16, and employing actuators 18 to adjust powertrain operation based on the received signals and instructions stored in a memory of the controller 12. However, it will be appreciated that in alternate embodiments, the powertrain control methods discussed herein may be applied to other hybrid vehicle configurations.

The powertrain 104 includes the ICE 102, and the motor 106 and the generator 108 coupled to the ICE 102 via the planetary gear unit 110. In other examples, other types of power transfer units, including other gear sets and transmissions, may be used to connect ICE 102 to the motor 106 and the generator 108. The planetary gear unit 110 may be a conventional planetary gear unit including a ring gear, a carrier, planet gears, and a sun gear. In one example, the generator 108 is connected to the sun gear, the ICE 102 is connected to the carrier via a damper, and the motor 106 is connected to the ring gear. However, other arrangements are possible.

The generator 108 may be used to control rotational speed of ICE 102 via planetary gear unit 110. For example, the generator 108 controls engine speed by applying a generator torque 144 via a shaft coupled to the planetary gear unit 110. The generator 108 may also assist the ICE 102 to fulfil a driver demand. The generator torque 144 applied to the planetary gear unit 110 may be either positive or negative, as indicated by the double-headed arrow. The motor 106 may be used to control tractive force supplied to the drive axle 114 via planetary gear unit 110. For example, the motor 106 controls tractive force by applying a motor torque 148 via a shaft coupled to the planetary gear unit 110. The motor 106 may also assist the ICE 102 to fulfil a driver demand. The motor torque 148 applied to the planetary gear unit 110 motor 106 may be either positive or negative, as indicated by the double-headed arrow. Operation of ICE 102 supplies an engine torque 150 to a shaft coupled to the planetary gear unit 110. The engine torque 150 applied to the planetary gear unit 110 motor 106 may be a positive engine torque, as indicated by the single-headed arrow. Operation of the powertrain 104 supplies a wheel torque 152 to a shaft coupled to the planetary gear unit 110 and the drive axle 114. The wheel torque 152 applied to the drive axle 114 may be a positive or negative, as indicated by the double-headed arrow.

In the embodiment shown in FIG. 1, the generator 108 and the motor 106 may both be operated as motors using electric current 146 from the battery 112 or another source of electric current to provide a desired output torque. Alternatively, the generator 108 and the motor 106 may be operated as generators supplying electric current 146 to a high voltage bus and/or to an energy storage device, such as the battery 112. Other types of energy storage devices and/or output devices that can be used include, for example, a capacitor bank, a fuel cell, a flywheel, etc. Other vehicles within the scope of the present disclosure may have different electric machine arrangements, such as more or less than the two electric machines (generator 108 and motor 106) depicted herein.

Controller 12 may comprise a portion of a control system 14. One or more controllers 12 implemented in hardware and/or software are provided to control components of powertrain 104. In the embodiment of FIG. 1, controller 12 is a vehicle system controller (VSC). Controller 12 is shown as a conventional microcomputer including: microprocessor unit 2, input/output ports 4, read-only memory 6 (e.g., non-transitory memory for storing instructions) for executable programs (e.g., executable instructions) and calibration values shown as non-transitory read-only memory chip in this particular example, random access memory 8, keep alive memory 9, and a conventional data bus. Controller 12 may include an interface 10. Interface 10 may include a variety of interfaces, for example, one or more interfaces for users. Interface 10 may include data output devices.

Although controller 12 is shown as a single controller, it may include multiple hardware and/or software controllers. For example, controller 12 may include a separate powertrain control module (PCM), which could be software embedded within controller 12, or the PCM could be implemented by a separate hardware device with corresponding software. A controller area network (CAN) may be used to communicate control data and/or commands between controller 12, powertrain 104, and one or more other controllers, such as a battery control module (BCM). For example, the BCM may communicate data such as battery temperature, state-of-charge (SOC), discharge power limit, and/or other operating conditions or parameters of battery 112. Devices other than the battery 112 may also have dedicated controllers or control modules that communicate with controller 12 to implement control of the vehicle and powertrain. For example, an engine control unit (ECU) may communicate with controller 12 to control operation of ICE 102. Similarly, controller 12 may include a separate generator control unit (GCU) and a separate motor control unit (MCU) to implement control of the electric machines.

Control system 14 including controller 12 may communicate with one or more of ICE 102, motor 106, generator 108, battery 112, drive axle 114, and driver pedal 30. Control system 14 may receive sensory feedback information from one or more of ICE 102, motor 106, generator 108, battery 112, drive axle 114, and driver pedal 30. Example of sensors 16 may detect a driver demand, engine speed, engine torque, motor torque, motor speed, generator torque, generator speed, wheel speed, battery charge, and other powertrain operation parameters. Further, control system 14 may send control signals via one or more of actuators 18 to one or more of ICE 102, motor 106, generator 108, and battery 112, etc., responsive to this sensory feedback. Control system 14 may receive an indication of an operator requested output (e.g., torque increase, decrease) of the powertrain system from a human operator, or an autonomous controller.

For example, in response to driver 32 (human or autonomous) depressing the driver pedal 30 (e.g. a tip-in condition), controller 12 may generate a wheel torque request 126 to provide a desired vehicle speed and rate of increase based on a position of the driver pedal 30 as indicated by pedal position sensor 34 and feedback from wheel speed sensor 121 indicating a wheel torque delivered 142. The wheel torque request 126 may generate a plurality of commands to the ICE 102, generator 108, and the motor 106 to adjust the wheel torque 152 to target the wheel torque delivered 142. Based on the wheel torque request 126, the controller 12 may generate an ICE power command 128 and an ICE torque command 130 to adjust the engine torque 150 output by the ICE 102. The generator 108 applies a reaction torque to a positive engine torque, thereby resisting the ICE 102. The generator torque 144 output by the generator 108 may be a negative mechanical torque that corresponds to a generating power or discharging power depending on the speed of the generator 108. An ICE speed command 132 and an ICE speed 120 may be input to a generator speed control 134 for generating a generator torque command 136. The generator torque command 136 controls the generator torque 144 output between the generator 108 and the planetary gear unit 110 based on feedback from the ICE speed 120 to maintain the ICE speed command 132. Based on the wheel torque request 126 and the generator speed control 134, a motor torque determination 138 is made and a motor torque command 140 obtained therefrom. The motor torque command 140 controls the motor torque 148 output between the motor 106 and the planetary gear unit 110 to provide tractive force to the wheels 118.

Generator torque 144 constrains ICE speed 120 when the ICE 102 is making positive torque. The amount of generator torque 144 commanded to maintain the ICE speed command 132 depends on the engine torque 150 output by the ICE 102. If a speed increase is requested, the generator torque command 136 may be adjusted to constrain the ICE 102 less and allow the engine torque to increase the ICE speed 120. In some examples, the generator 108 may assist the ICE 102 to increase the ICE speed 120. In which case, the generator 108 drives the ICE 102 and rather than constraining the ICE 102. The driver pedal 30 may influence (e.g., a full pedal, less than full pedal) whether generator assistance is desired or whether the generator torque 144 can remain negative and resist the ICE 102 to some extent.

For example, under conditions when the ICE 102 is running and operating at a low torque, such as conditions when the battery 112 is full, the generator torque 144 may be slightly negative and near zero. In examples of existing control strategies, if the driver tips in to the pedal, the control system aims to increase ICE speed to meet the wheel torque request. In such examples, due to the low engine torque, the control system generates a positive generator torque command to assist the engine to meet the increased engine speed request. As a result, the generator crosses lash and subsequently a driveline clunk may be heard and felt in the vehicle.

The systems and methods disclosed herein reduce incidence of clunk resulting from the generator 108 transitioning from low negative to positive torque. As one example, a controller, such as the controller 12, may be configured limit an increase in engine speed in response to a generator torque approaching zero generator torque during selected conditions. As the generator torque command 136 is adjusted based on feedback controls of a target engine speed, by slowing a rate of increase of the ICE speed command 132, the generator torque command 136 may remain negative, continue to constrain the ICE 102, and thereby prevent generator lash crossing. As a few non-limiting examples, the selected conditions may include less than threshold driver pedal operation, standard engine operating conditions, and greater than threshold battery state of charge. In one example, less than threshold driver pedal operation may include a tip in condition that is less than a full pedal request. Standard engine operating conditions may include non-engine startup conditions and the engine running, e.g., the engine is fueled and combusting the fuel mixture, and further may include conditions where emissions control strategies are meeting expectation. Greater than threshold battery state of charge may include a threshold calibrated to provide a battery demand for predicted/estimated vehicle operations. In one example, the selected conditions may include those where it is acceptable to somewhat limit the rate at which a wheel torque request is met, and conditions where the disclosed strategy does not interfere with other (e.g., higher priority) control strategies such as emissions control, battery power control, and engine startup. During the selected conditions, the generator torque may remain negative during a duration of a driver tip-in, and as more engine torque becomes available during the tip-in, the limiting may be reduced. In one example, the limit may comprise an inertia-based rate clip to an engine speed command, which may be determined based on an estimate of an amount of allowable engine speed increase while maintaining negative generator torque. In this way, by limiting the engine speed request and allowing a higher engine speed rate as more engine torque becomes available, generator lash crossing and incidence of clunk resulting therefrom may be reduced under selected conditions.

FIG. 2A and FIG. 2B illustrate example methods for managing lash crossing in a hybrid powersplit vehicle according to at least some of the embodiments of the present disclosure. The example methods manage generator lash crossing by applying an inertia-based rate clip to an engine speed increase in response to generator torque approaching zero generator torque during selected conditions. FIG. 2A describes a first method 200 for determining whether selected conditions are met to apply the inertia-based rate clip. FIG. 2B describes a second method 250 for determining the inertia-based rate clip. In some examples, the method 250 described with reference to FIG. 2B may be a sub-method of the method 200 described with reference to FIG. 2A. Instructions for carrying out the method 200 and the rest of the methods included herein may be executed by a controller based on instructions stored on a memory of the controller and in conjunction with signals received from sensors of the powertrain system, such as control system 14, controller 12, and sensors 16 described above with reference to FIG. 1. The controller may adjust actuators of the powertrain system to adjust powertrain operation, according to the methods described below.

At 202, method 200 may include determining operating conditions. Operating conditions may include a position of a driver pedal (e.g., tip-in, tip-out), an engine speed, a generator speed, a motor speed, a battery state of charge (SOC), a wheel speed, and so on. In one example, the driver pedal may control vehicle speed and not vehicle wheel calipers.

At 204, method 200 may include determining whether engine running is indicated. In one example, the method 200 may determine the engine is running based on a sensor signal from one of sensors 16 indicating greater than threshold engine speed. In one example, the greater than threshold engine speed may be a non-zero positive value threshold. As a non-limiting example, the threshold engine speed may be greater than 600 RPM. In one example, engine running may indicate standard engine operation conditions, e.g., non-engine startup conditions and emissions control conditions. If engine running is indicated, the method may continue to 206. If engine running is not indicated, the method continues to 214.

At 214, the method 200 includes determining whether an engine start timer is greater than a threshold. In one example, the engine start timer threshold may be a non-zero positive value threshold. As a non-limiting example, the engine start time threshold may be 5 seconds. In one example, engine start timer greater than a threshold may indicate standard engine operating conditions. For example, completion of cold start emissions control mode is a precondition for the engine start timer. If engine start timer greater than a threshold is indicated, the method 200 may direct to 206. If engine start timer greater than a threshold is not indicated the method 200 may monitor the engine start time threshold at 214.

At 206, method 200 may include determining whether a tip-in condition is indicated. In other words, the method 200 may include determining whether a wheel torque request is received based on a pedal position sensor signal indicating a tip-in or depression applied to the driver pedal. In some examples, the tip-in may be applied by a driver, such as the driver 32 applying pressure to the driver pedal 30 in FIG. 1. If a tip-in is not indicated, the method may direct to 204. If a tip-in does not occur, the method may include continuously monitoring for indication of a tip-in condition.

If a tip-in is indicated, at 208 the method 200 may include determining selected conditions. For example, selected conditions may comprise standard engine operating conditions (e.g., as determined above), less than threshold driver pedal position, and greater than threshold battery state of charge. In one example, the threshold driver pedal position may be a non-zero positive value threshold. As a non-limiting example, the threshold driver pedal position may be a pedal position indicating less than 70% depressed. In one example, the greater than threshold battery state of charge may be a non-zero positive value threshold. In one example, the method may include comparing the battery power state of charge minus a calibrated buffer to the threshold battery state of charge. As a non-limiting example, the threshold battery state of charge may be greater than 25% charged.

At 210, the method 200 may include determining whether selected conditions are met. For example, the method may include determining whether one or more of the selected conditions is met. In other examples, the method may include determining whether a plurality of the conditions are met. In yet another example, the method may include determining whether each and every condition is met. Determining whether each and every condition is met may ensure that the strategy does not interfere with higher priority control strategies such as emissions control, battery power control, and engine startup, nor overly constrain vehicle operation. For example, during high pedal position, reducing the rate of wheel torque request fulfillment may have a negative effect on the overall driving experience.

If selected conditions are met, at 212 the method may include determining an inertia-based rate clip to an engine speed increase. In one example, the inertia-based rate clip is determined based on an estimate of an amount of allowable engine speed increase while maintaining negative generator torque. An example method for determining an inertia-based rate clip is described below with reference to FIG. 2B.

At 216, the method may include applying the inertia-based rate clip to the engine speed command. For example, the controller may determine a control signal to send to the generator control unit, such as a pulse width modulation signal, the pulse width of the signal corresponding to the inertia-based rate clip. In some examples, the method 200 may include reducing the inertia-based rate clip as more engine torque becomes available. For example, the method may include monitoring the engine torque output and in response to the engine torque output exceeding a threshold, the method may include reducing the inertia-based rate clip at a calibrated rate based on the engine torque output. In some examples, in response to applying the inertia-based rate clip to the engine speed command, the method may further include commanding a motor torque increase to assist the powertrain to deliver the wheel torque request indicated by the driver tip in. In one example, in response to the one or more selected conditions no longer being met during clipping, the method may include removing the inertia-based rate clip. For example, the rate may increase discontinuously (e.g., produce an elbow in the speed command).

In this way, a method for generator lash management may be applied selectively and interference with other control strategies, such as engine startup, emissions control, battery power management, and high pedal demand, may be reduced.

FIG. 2B describes a second method 250 for managing generator lash crossing including an example approach for determining the inertia-based rate clip, such as described above with reference to FIG. 2A.

At 252, the method 250 may include receiving an engine torque estimate. In one example, a controller and/or an ECU, may estimate the engine torque based on one or more sensor signals. For example, the controller 12 may receive from one or more of sensors 16 a signal indicating one or more of crankshaft position, a throttle position, a mass air flow reading, a manifold pressure reading, and an air to fuel ratio from which the controller 12 may estimate an amount of engine torque produced.

At 254, the method 250 may include receiving a generator torque estimate. In one example, a controller and/or a GCU, may estimate the generator torque based on one or more sensor signals. For example, the controller 12 may receive from one or more of sensors 16 a signal indicating electric current and/or voltage through the generator from which the controller may estimate an amount of generator torque produced.

At 256, the method 250 may include receiving a vehicle speed. In one example, a controller and/or a GCU, may estimate the generator torque based on one or more sensor signals. For example, the controller 12 may receive from wheel speed sensor 121 a signal indicating a rotational speed of the wheels from which the controller may estimate the vehicle speed.

At 258, the method 250 may include calibrating an offset based on the vehicle speed. For example, the method may include obtaining a calibrated offset based on a two-dimensional function with the vehicle speed as an input. In one example, the calibrated offset that is output by the two-dimensional function may increase as vehicle speed decreases, and decrease as vehicle speed increases. In other words, the method may include a larger offset at lower vehicle speed thereby implementing a more conservative intervention to reduce lash crossing. At higher vehicle speed, where there is road noise, wind, and vibration to mask lash crossing, the offset may be smaller. In some examples, the method may include calibrating the offset negative at higher speeds to allow generator torque assist (e.g., and lash crossing) with the engine speed.

At 260, the method 250 may include determining an inertia torque. In one example, the inertia torque may be determined based on the engine torque estimate minus the calibrated offset. Further, if the offset is calibrated in units of generator torque, the method may include converting the offset to the engine torque domain using a gear ratio.

At 262, the method 250 may include determining the inertia-based rate clip. In one example, the inertia-based rate clip may be determined based on the inertia torque divided by lumped engine and generator inertia. In some examples, the lumped engine and generator torque may be determined experimentally. In other examples, if the individual engine and generator inertias are known, the relationship of the generator and engine relative to the planetary gear unit may be used to derive a lumped inertia. For example, lumped inertia may be determined based on the sum of engine inertia and the generator inertia divided by the engine to generator gear ratio squared.

In this way, a method for generator lash management may account for an amount of engine torque being produced, including a calibrated offset, to predict an amount of allowable engine speed increase without while maintaining negative generator torque during a tip in.

FIG. 3 and FIG. 4 are timing diagrams illustrating a sequence of actions performed within a method for generator lash crossing management for an exemplary hybrid powersplit vehicle system. The method for generator lash crossing management may be the same as or similar to the series of actions described above with reference to methods 200 and 250 in FIGS. 2A-2B, respectively. The hybrid powersplit vehicle system may be the same or similar to vehicle 100 shown in FIG. 1. Instructions for performing the methods described in timing diagrams 300, 400 may be executed by a controller (e.g., controller 12) based on instructions stored on a memory of the controller and in conjunction with sensory feedback received from components from the vehicle drivetrain system, including sensors detecting a driver wheel request, engine speed, engine torque, motor torque, motor speed, generator torque, generator speed, wheel speed, battery charge, and other powertrain operation parameters (e.g., sensors 16) described above with reference to FIG. 1. In the prophetic examples, the controller determines whether a tip-in is indicated. If a tip-in is indicated, the controller determines whether selected conditions are met. In response to selected conditions being met, the controller determines an inertia-based rate clip and applies the inertia based rate clip to the engine speed command, the engine speed command determined based on a driver wheel torque request indicated by the tip-in. By applying the inertia-based rate clip, the generator may be controlled to not cross the lash, or in other words, not exceed zero torque. FIG. 3 depicts a scenario illustrating the generator lash crossing management strategy where selected conditions are met. FIG. 4 depicts a scenario illustrating the generator lash crossing management strategy where selected conditions are not met. The horizontal (x-axis) denotes time and the vertical markers t0-t4 and t0-t6 identify relevant times in timing diagrams 300, 400, respectively, for generator lash crossing management.

Timing diagram 300 of FIG. 3 shows plots 302, 304, 306, 308, 310, 312, 314, 316, and 324 which illustrate states of components and/or control settings of the vehicle system over time. Plot 302 indicates a wheel torque request. Plot 304 indicates an engine speed. Plot 306 indicates an engine torque estimate. Plot 308 indicates driver pedal including a tip-in threshold 320. Increasing driver pedal indicates a tip-in, or in other words, an increasing wheel torque request. The tip-in threshold may represent a positive value non-zero threshold, e.g., more than 90% depressed, which may indicate a relatively high pedal position or urgent wheel torque request. Plot 310 and plot 312 indicate generator torque estimate and motor torque estimate, respectively, which may be positive or negative. Plot 314 indicates generator disturbance, which may be a measurement of generator angular rate of change of rotational speed. Plot 316 indicates a battery state of charge (SOC) including a battery charge threshold 322. A magnitude of the inertia-based rate clip is indicated in plot 324 and a normal engine speed rate limit is indicated in plot 318. In one example, the normal engine speed rate limit may be selected to balance fast engine power output response for best performance with NVH (noise vibration and harshness), and engine speed busyness constraints on the maximum rate of change of engine speed. When the magnitude of the inertia-based rate clip is larger than the normal engine speed rate limit, the inertia-based rate clip has no effect. Further, when the entry conditions are not met (e.g., see FIG. 4), the normal engine speed rate limit is used, regardless of whether the lash reduction rate limit is smaller or not. The battery charge threshold may represent a positive value non-zero threshold, which may be calibrated to a sufficient level of battery charge to limit an engine speed increase by the inertia-based rate clip e.g., more than 30% charged. Plots 310, 312 show a positive increase upwards along the y-axis and values become increasingly more negative down the y-axis. Plots 302, 304, 306, 308, 314, 316, 324 show an increase upwards along the y-axis.

At t0, the wheel torque request is approximately zero in plot 302. The engine speed is low in plot 304. The engine torque is near zero in plot 306. The driver pedal is not depressed in plot 308. Generator torque is slightly negative in plot 310. Motor torque is approximately zero in plot 312. Generator disturbance is near zero in plot 314. The battery SOC is relatively high. An inertia-based rate clip is not applied in plot 324. The normal engine speed rate limit in plot 318 is applied. From t0-t1, the plots remain relatively constant.

At t1, a tip-in is detected in plot 308. In response to the tip-in, from t1 to t2 the controller determines selected conditions for managing generator lash. In this example, selected conditions include less than threshold driver pedal operation in plot 308, greater than threshold battery state of charge in plot 316, and engine speed in plot 304 indicating non-engine startup conditions. Not shown in the timing diagram 300, emissions control is also a selected condition determined by the controller.

At t2, the controller determines selected conditions are met. Therefore, at t2, the controller determines an inertia-based rate clip to apply to the engine speed command. The inertia-based rate clip is determined based on an inertia torque divided by lumped engine and generator inertia. The inertia torque is determined based on a difference of the engine torque estimate (in plot 306) and a calibrated offset related to vehicle speed (e.g., received via the wheel speed sensor 121 in FIG. 1). In other words, inertia-based rate clip may estimate a threshold rate of engine speed increase while maintaining negative generator torque, or, how quickly the engine speed in plot 304 can change without the generator torque going positive (crossing lash) to assist.

From t2-t3, the controller applies the inertia-based rate clip to the engine speed command. The magnitude of the inertia-based rate clip in plot 324 is relatively low near t2 and increases with engine torque. The application of the inertia-based rate clip to the engine speed command constrains the engine speed rise rate, which is indicated by a very gentle increase in engine speed in plot 304. As can be seen, the engine speed is nearly level for much of t2 to t3, increasing as time approaches t3 as engine torque increases in plot 306. As engine torque increases as time approaches t3, the magnitude of the inertia-based rate clip increases. By limiting the engine speed rise rate, the generator torque is not commanded to generate positive torque to assist the engine speed increase. Instead the generator continues to provide a resistance torque to the positive engine torque, which is indicated by decreasing generator torque in plot 310 from t2 to t3. The controller commands the motor to increase motor torque to assist wheel torque delivery to meet the wheel torque request in plot 302, which is indicated by an increase in motor torque in plot 312. As such, the battery state of charge in plot 316 decreases slightly from t2 to t3. From t2 to t3, the generator torque is maintained negative, thereby reducing lash crossing, which is indicated by the very low generator disturbance in plot 314.

At t3, the calculation of the inertia-based rate clip in plot 324 is larger than the normal engine speed rate clip in plot 318. As may be understood, the engine torque at which the engine speed is no longer modified by the inertia-based rate clip depends on the normal engine speed rate limit, which varies based on other conditions. From t3 to t4, the inertia based rate clip has no effect on the engine speed in plot 304 and the normal engine speed limit in plot 318 is applied to engine speed to target the engine speed command. At t4, a tip-out is detected.

Timing diagram 400 of FIG. 4 shows plots 402, 404, 406, 408, 410, 412, 414, and 416 which illustrate states of components and/or control settings of the vehicle system over time. Plot 402 indicates a wheel torque request. Plot 404 indicates engine speed. Plot 406 indicates an engine torque estimate. Plot 408 indicates driver pedal including a tip-in threshold 418. Increasing driver pedal indicates a tip-in, or in other words, an increasing wheel torque request. The tip-in threshold may represent a positive value non-zero threshold, e.g., more than 90% depressed, which may indicate a relatively high pedal position or urgent wheel torque request. Plot 410 and plot 412 indicate generator torque estimate and motor torque estimate, respectively, which may be positive or negative. Plot 414 indicates generator disturbance, which may be a measurement of generator angular rate of change of rotational speed. Plot 416 indicates battery state of charge (SOC) including a battery charge threshold 422. The battery charge threshold 422 may represent a positive value non-zero threshold, which may be calibrated to a sufficient level of battery charge to limit the engine speed increase by the inertia-based rate clip e.g., more than 40% charged. A magnitude of a normal engine speed rate limit is indicated in plot 424. When the entry conditions are not met, the normal engine speed rate limit in plot 424 is used, regardless of whether an inertia-based rate clip is smaller or not. Plots 410, 412 show a positive increase upwards along the y-axis and values become increasingly more negative down the y-axis. Plots 402, 404, 406, 408, 414, 416, and 424 show an increase upwards along the y-axis.

At t0, the wheel torque request is approximately zero in plot 402. The engine speed is low in plot 404. The engine torque is low (e.g., near zero) in plot 406. The driver pedal is not depressed in plot 408. Generator torque is negative in plot 410. Motor torque is slightly positive in plot 412. Generator disturbance is near zero in plot 414. Battery SOC is moderately high. From t0-t1, the plots remain relatively constant. The normal engine speed rate limit is applied in plot 424.

At t1, a tip-in is detected in plot 408. In response to the tip-in, from t1 to t2 the controller determines selected conditions for managing generator lash. In this example, selected conditions include less than threshold driver pedal operation in plot 408, greater than threshold battery state of charge in plot 416, and engine speed in plot 404 indicating non-engine startup conditions. Not shown in the timing diagram 400, emissions control is also a selected condition determined by the controller.

At t2, the driver pedal increases above the threshold driver pedal operation in plot 408 indicating the selected conditions are not met. Therefore at t2, the controller generates a command to increase engine speed in plot 404 based on the wheel torque request in plot 402 applying the normal engine speed rate limit in plot 424. From t2-t3, the controller commands the engine speed to increase applying the normal engine speed rate limit, or in other words, without an inertia-based rate clip. The controller commands the generator to assist the engine in ramping the engine to meet the wheel torque request, which is indicated by increasing generator torque from t2 to t3 in plot 410.

At t3, the generator torque crosses the zero torque point, e.g., crosses lash. From t3 to t4, lash crossing is shown as increased generator disturbance in plot 414. Generator torque is positive and assisting the engine to ramp to the engine speed command. Engine torque increases from t3 to 4. As a result of the engine ramping with the assistance of the generator, the engine speed in plot 404 increases from t3 to t4. In this case, and indicated by the high driver pedal position, reducing generator disturbance such as bumps, lash, and/or clunk may be a lower priority to the driver than fulfilling the wheel torque request.

At t4, feedback control from the engine speed estimate in plot 404 and the engine speed command based on the wheel torque request in plot 402 indicates positive generator torque assist to ramping the engine may be reduced. Therefore at t4, the controller commands the generator to reduce generator torque, which indicated by decreasing generator torque from t4 to t5 in plot 410.

At t5, the generator torque crosses the zero torque point, e.g., crosses lash. From t5 to t6, lash crossing is felt as increased generator disturbance in plot 414. At t6, a tip-out is detected.

In this way, the systems and methods described herein manage generator lash crossing in hybrid powersplit powertrain vehicles. The disclosed approach mitigates an engine on, driver tip-in generator lash crossing by applying an inertia-based rate clip to an engine speed increase under selected conditions. The inertia-based rate clip may comprise a control strategy accounting for an amount engine torque being produced, including a calibrated offset, which predicts an amount of allowable engine speed increase without causing the generator to cross lash. As a result, the generator reducing potential for crossing lash, maintaining negative generator torque during a duration of a driver tip-in. By applying the inertia-based rate clip under selected conditions, and not applying the clip when the conditions are not met, the approach attempts to reduce lash during conditions where it is acceptable to somewhat limit the rate at which a wheel torque request is met, and conditions where the disclosed strategy does not interfere with other (e.g., higher priority) control strategies such as high pedal demand, emissions control, battery power control, and engine startup. The technical effect for generator lash management in a hybrid powersplit powertrain is increased drivability.

The disclosure also provides support for a method for managing lash crossing in a hybrid powersplit vehicle, the method comprising: limiting an increase in engine speed in response to a generator torque approaching zero generator torque during selected conditions. In a first example of the method, the selected conditions comprise less than threshold driver pedal operation, non-engine startup conditions, emissions control, and greater than threshold battery state of charge. In a second example of the method, optionally including the first example, the generator torque is maintained negative during a duration of a driver tip-in. In a third example of the method, optionally including one or both of the first and second examples, the method further comprises: reducing the limiting as engine torque increases during a tip-in. In a fourth example of the method, optionally including one or more or each of the first through third examples, the limiting comprises applying an inertia-based rate clip to an engine speed request. In a fifth example of the method, optionally including one or more or each of the first through fourth examples, the inertia-based rate clip is determined based a threshold rate of engine speed increase while maintaining negative generator torque. In a sixth example of the method, optionally including one or more or each of the first through fifth examples, the inertia-based rate clip is determined based on an amount engine torque produced and a calibrated offset. In a seventh example of the method, optionally including one or more or each of the first through sixth examples, the calibrated offset is determined based on a two-dimensional function having an input of vehicle speed. In a eighth example of the method, optionally including one or more or each of the first through seventh examples, the inertia-based rate clip is determined based on an inertia torque divided by lumped engine and generator inertia, wherein the inertia torque is determined based on a difference of an engine torque estimate and a calibrated offset. In a ninth example of the method, optionally including one or more or each of the first through eighth examples, the method further comprises: commanding a motor torque increase in response to limiting the engine speed.

The disclosure also provides support for a system comprising: a powertrain having an engine, an electric motor, an electric generator, a battery, and a planetary gear unit, and a controller, storing instructions in non-transitory memory that, when executed cause the controller to, limit an increase in engine speed in response to a generator torque approaching zero generator torque during selected conditions. In a first example of the system, the selected conditions comprise less than threshold driver pedal operation, non-engine startup conditions, emissions control, and greater than threshold battery state of charge. In a second example of the system, optionally including the first example, the generator torque is maintained negative during a duration of a driver tip-in. In a third example of the system, optionally including one or both of the first and second examples the controller further configured to, reduce the limit as engine torque increases during a tip-in. In a fourth example of the system, optionally including one or more or each of the first through third examples, the limit comprises an inertia-based rate clip to an engine speed request.

The disclosure also provides support for a method for a hybrid powersplit vehicle, the method comprising: during a tip-in condition, and in response to selected conditions, receiving an estimate of engine torque, an estimate of generator torque, and a vehicle speed, calibrating an offset based the vehicle speed, determining an inertia torque based on the engine torque, the offset, and a ratio of the engine torque to the generator torque, determining an inertia-based rate clip based on the inertia torque and a lumped engine and generator inertia, and applying the inertia-based rate clip to an engine speed command. In a first example of the method, the selected conditions comprise less than threshold driver pedal operation, non-engine startup conditions, emissions control, and greater than threshold battery state of charge. In a second example of the method, optionally including the first example, the generator torque is maintained negative during a duration of the tip-in condition. In a third example of the method, optionally including one or both of the first and second examples, the method further comprises: commanding a motor torque increase in response to applying the inertia-based rate clip. In a fourth example of the method, optionally including one or more or each of the first through third examples, the method further comprises: reducing the inertia-based rate clip as more engine torque becomes available during a tip-in.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for managing lash crossing in a hybrid powersplit vehicle, the method comprising:

limiting an increase in engine speed in response to a generator torque approaching zero generator torque during selected conditions, wherein the limiting comprises applying an inertia-based rate clip to an engine speed request, the inertia-based rate clip is determined based on an amount of engine torque produced and a calibrated offset, and where the calibrated offset is determined based on a two-dimensional function having an input of vehicle speed.

2. The method of claim 1, wherein the selected conditions comprise less than threshold driver pedal operation, non-engine startup conditions, emissions control, and greater than threshold battery state of charge.

3. The method of claim 1, wherein the generator torque is maintained negative during a duration of a driver tip-in.

4. The method of claim 1, further comprising reducing the limiting as engine torque increases during a tip-in.

5. The method of claim 1, wherein the inertia-based rate clip is determined based a threshold rate of engine speed increase while maintaining negative generator torque.

6. The method of claim 1, wherein the inertia-based rate clip is determined based on an inertia torque divided by lumped engine and generator inertia, wherein the inertia torque is determined based on a difference of an engine torque estimate and a calibrated offset.

7. The method of claim 1, further comprising commanding a motor torque increase in response to limiting the engine speed.

8. A system comprising:

a powertrain having an engine, an electric motor, an electric generator, a battery, and a planetary gear unit; and a controller, storing instructions in non-transitory memory that, when executed cause the controller to, limit an increase in engine speed in response to a generator torque approaching zero generator torque during selected conditions, where the generator torque does not cross zero generator torque during a duration of a driver tip-in, wherein the limiting comprises applying an inertia-based rate clip to an engine speed request, and wherein the inertia-based rate clip is determined based on an inertia torque divided by lumped engine and generator inertia, wherein the inertia torque is determined based on a difference of an engine torque estimate and a calibrated offset.

9. The system of claim 8, wherein the selected conditions comprise less than threshold driver pedal operation, non-engine startup conditions, emissions control, and greater than threshold battery state of charge.

10. The system of claim 8, wherein the generator torque is maintained negative during a duration of a driver tip-in.

11. The system of claim 8, the controller further configured to, reduce the limit as engine torque increases during a tip-in.

12. The system of claim 8, wherein the limit comprises an inertia-based rate clip to an engine speed request.

13. A method for a hybrid powersplit vehicle, the method comprising:

during a tip-in condition; and in response to selected conditions;

receiving an estimate of engine torque, an estimate of generator torque, and a vehicle speed;

calibrating an offset based on the vehicle speed;

determining an inertia torque based on the engine torque, the offset, and a ratio of the engine torque to the generator torque;

determining an inertia-based rate clip based on the inertia torque and a lumped engine and generator inertia; and applying the inertia-based rate clip to an engine speed command.

14. The method of claim 13, wherein the selected conditions comprise less than threshold driver pedal operation, non-engine startup conditions, emissions control, and greater than threshold battery state of charge.

15. The method of claim 13, wherein the generator torque is maintained negative during a duration of the tip-in condition.

16. The method of claim 13, further comprising commanding a motor torque increase in response to applying the inertia-based rate clip.

17. The method of claim 13, further comprising reducing the inertia-based rate clip as more engine torque becomes available during the tip-in condition.

* * * * *